United States Patent
Berlioux et al.

(10) Patent No.: US 11,945,183 B2
(45) Date of Patent: Apr. 2, 2024

(54) INSTALLATION FOR MANUFACTURING BEAD WIRES FOR TIRES, COMPRISING A CRIMPING STATION PROVIDED WITH A SUBASSEMBLY FOR AUTOMATICALLY PREPARING CRIMPING SLEEVES

(71) Applicant: Compagnie Generale Des Etablissements Michelin, Clermont-Ferrand (FR)

(72) Inventors: Loic Berlioux, Clermont-Ferrand (FR); Christophe Amyot, Clermont-Ferrand (FR)

(73) Assignee: Compagnie Generale Des Etablissements Mic, Clermont-Ferrand (FR)

( * ) Notice: Subject to any disclaimer, the term of this patent is extended or adjusted under 35 U.S.C. 154(b) by 458 days.

(21) Appl. No.: 17/417,279

(22) PCT Filed: Dec. 18, 2019

(86) PCT No.: PCT/FR2019/053139
§ 371 (c)(1),
(2) Date: Jun. 22, 2021

(87) PCT Pub. No.: WO2020/136324
PCT Pub. Date: Jul. 2, 2020

(65) Prior Publication Data
US 2022/0072819 A1 Mar. 10, 2022

(30) Foreign Application Priority Data

Dec. 27, 2018 (FR) .............................. 20180074245
Jan. 31, 2019 (FR) .............................. 20190000959

(51) Int. Cl.
*B29D 30/48* (2006.01)
*B21F 15/06* (2006.01)

(52) U.S. Cl.
CPC .............. *B29D 30/48* (2013.01); *B21F 15/06* (2013.01); *B29D 2030/487* (2013.01)

(58) Field of Classification Search
CPC ................................................ B29D 2030/487
See application file for complete search history.

(56) References Cited

U.S. PATENT DOCUMENTS

2008/0277040 A1  11/2008  Okamoto et al.
2013/0186508 A1*  7/2013  Anagnostopoulos ... B21F 15/08
                                                    140/1
2021/0269184 A1*  9/2021  Morijiri .................. B65B 57/04

FOREIGN PATENT DOCUMENTS

FR     2985922 A1    7/2013
JP     S51119775 A   10/1976

(Continued)

*Primary Examiner* — Robert C Dye
*Assistant Examiner* — Alexander D Booth
(74) *Attorney, Agent, or Firm* — Dickinson Wright PLLC (57) ABSTRACT

A crimping station comprising a crimping tool designed to crimp a sleeve around a first end portion of a thread and around a second end portion of a thread, said crimping station comprising a sleeve preparation subassembly which has a feed device that supplies a metal strip and conveys said strip as far as a shaping device designed to plastically deform said strip in order to give said strip a concave curved cross section, so as to obtain a preformed strip, and then as far as a cutting device which is designed to sever a portion of length of said preformed strip in order to obtain a sleeve preform that a loading tool places within the crimping tool.

13 Claims, 5 Drawing Sheets

(56) References Cited

FOREIGN PATENT DOCUMENTS

| | | |
|---|---|---|
| JP | S5634444 A | 4/1981 |
| JP | 2007160640 A | 6/2007 |
| JP | 2008238808 A | 10/2008 |

\* cited by examiner

INSTALLATION FOR MANUFACTURING BEAD WIRES FOR TIRES, COMPRISING A CRIMPING STATION PROVIDED WITH A SUBASSEMBLY FOR AUTOMATICALLY PREPARING CRIMPING SLEEVES

CROSS-REFERENCE TO RELATED APPLICATION

This application claims priority to and the benefit of PCT Patent Application No. PCT/FR2019/053139 filed on 18 Dec. 2019, entitled "UNIT FOR MANUFACTURING BEADS FOR TIRES, COMPRISING A CRIMPING STATION PROVIDED WITH A SUB-ASSEMBLY FOR AUTOMATICALLY PREPARING CRIMPING SLEEVES," and French Patent Application No. 20190000959, filed on 31 Jan. 2019, entitled "INSTALLATION FOR MANUFACTURING BEADS FOR TIRES, COMPRISING A CRIMPING STATION PROVIDED WITH A SUB-ASSEMBLY FOR AUTOMATICALLY PREPARING CRIMPING SLEEVES" and French Patent Application No. 20180074245, filed on 27 Dec. 2018, entitled "INSTALLATION FOR MANUFACTURING BEADS FOR TIRES, COMPRISING A CRIMPING STATION PROVIDED WITH A SUB-ASSEMBLY FOR AUTOMATICALLY PREPARING CRIMPING SLEEVES".

BACKGROUND

1. Field

The present disclosure relates to the field of fixing threads by crimping, and more particularly the application of crimping to the manufacture of bead wires that are intended to reinforce pneumatic tires in order to allow such pneumatic tires to be fixed to a rim.

2. Related Art

It is known, in particular from the document JP-2005-238997, to produce a braided bead wire by winding a braid thread in helical turns around an annular core and by joining the ends of said thread together by way of a crimped sleeve.

However, such sleeves have a complex shape and are complicated to implement in particular because they comprise a first part that needs to be engaged on the core before the braid thread is braided on said core, and a second part secured to the first part, in which the ends of the braid thread need to be placed and which then needs to be bent by crimping onto said ends of the braid thread in order to ensure that said ends are held.

Moreover, such sleeves locally create an overthickness of the bead wire, this overthickness being liable to result in increased abrasion of the pneumatic tire in which the bead wire is incorporated, or to create a certain imbalance in said pneumatic tyre.

SUMMARY OF THE INVENTION

The objects assigned to the disclosure therefore aim to overcome the abovementioned drawbacks and to propose a novel type of crimping station, and more generally a novel type of installation for manufacturing bead wires, which allows automated, reliable and simple production of bead wires.

The objects assigned to the disclosure have been achieved by a crimping station comprising a crimping tool designed to crimp a sleeve around a first end portion of a thread and around a second end portion of a thread in order to join and fix together said first and second end portions, said crimping station further comprising a sleeve preparation subassembly which has a feed device that supplies a metal strip and conveys said strip as far as a shaping device designed to plastically deform said strip in order to give said strip a concave curved cross section, so as to obtain a preformed strip, and then as far as a cutting device which is designed to sever a portion of length of said preformed strip in order to obtain a sleeve preform that a loading tool places within the crimping tool, such that said crimping tool can press on and close up said sleeve preform, by plastic deformation, to form a sleeve around the first and second thread end portions.

Advantageously, the disclosure makes it possible to employ lightweight sleeves of simple shape that are produced in situ directly at the crimping station, and to automatically resupply the crimping tool in a perfectly controlled and reproducible manner.

Moreover, by producing the sleeves unitary for each crimping operation, directly in the crimping station, and specifically from a continuous strip that is easy to package, to store and to supply, the sleeve preforms are produced just in a necessary and sufficient quantity to carry out the intended crimping operation(s), thereby avoiding the need to form or handle a stock of sleeve preforms.

Finally, the disclosure makes it possible to produce and use sleeve preforms of very simple shape, which are therefore inexpensive to produce, the section of which is U-shaped and allows easy fitting of said sleeve preform on the thread portions to be joined together, thereby making it possible to simplify the architecture and the operation of the joining station, and more particularly to simplify the kinematics of the crimping tool.

The disclosure therefore allows the crimping station to be more compact and effective, makes it possible to reduce the crimping cycle time and to make raw material savings.

BRIEF DESCRIPTION OF THE DRAWINGS

Further objects, features and advantages of the disclosure will become apparent in more detail from reading the following description and with the aid of the appended drawings, which are provided purely by way of illustration and without limitation and in which.

DETAILED DESCRIPTION OF THE ENABLING EMBODIMENTS

The present disclosure relates to a crimping station 1 comprising a crimping tool 2 designed to crimp a sleeve 3 around a first end portion 5 of a thread 4 and around a second end portion 6 of a thread 4 in order to join and fix together said first and second end portions 5, 6.

The crimping station 1 can be used to join together a first end portion 5 belonging to a first thread 4 and a second end portion 6 belonging to a second thread 4 separate from the first thread, so as to create a splice that makes it possible to extend the first thread 4 by means of the second thread 5.

However, according to a preferred application variant, the crimping station 1 will be used to join and fix together a first end portion 5 and a second end portion 6 forming the two opposite longitudinal ends of one and the same thread 4, so as to close up said thread 4 on itself into a ring.

More preferably, the disclosure will relate to an installation 100 for manufacturing bead wires 9 intended to reinforce tires, in particular pneumatic tires, said installation 100 comprising a crimping station 1 according to the disclosure for closing on itself a constituent thread 4 of a bead wire 9.

Figure 9:
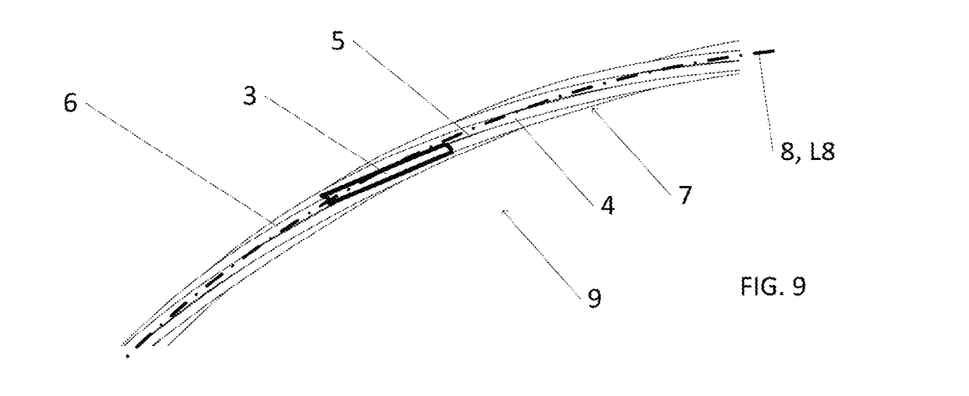
FIG. 9 illustrates a partial perspective view of a braided bead wire obtained by joining together the ends of a braid thread by a sleeve, by means of a crimping station according to the disclosure.

More particularly, as can be seen in FIG. 9, the bead wire 9 could be obtained from a braided torus which comprises at least one thread, called "braid thread" 4, which extends longitudinally, in one piece, from a first end portion 5 to a second end portion 6 and which is interwoven in helical turns 7 around, and along, a generatrix line L8 that forms a, preferably circular, ring around a main axis that corresponds to the central axis of said braided torus.

The crimping tool 2 will then be designed to join and fix together the first end portion 5 and the second end portion 6 by crimping the sleeve 3 onto said end portions 5, 6, so as to ensure the cohesion of the braided torus as an annular bead wire 9 element.

These bead wires 9 will typically be intended for pneumatic tires, the dimensions of which, which correspond to the diameter of the rims on which said tires are mounted, range from 13 inches to 24 inches. These pneumatic tires could in particular be intended to equip passenger vehicles. Of course, the disclosure is applicable to different pneumatic tire formats, in particular those intended for heavy duty vehicles or for construction plant vehicles.

The thread 4 could be a multi-strand thread, that is to say formed from an assembly of several interwoven strands, or, preferably, a single-strand thread, that is to say one formed from a single strand made in one piece.

The constituent material of the strand, or, where appropriate, of the strands, of said thread 4 will preferably be metallic, for example based on steel. This being the case, the thread 4 could be made from any appropriate material, including a polymer having sufficient stiffness in tension, or a composite metal and polymer material.

The cross section of the thread 4, which is preferably constant along said thread 4, could preferably have an overall diameter of between 1.20 mm and 3.5 mm, and for example chosen from 1.30 mm, 1.55 mm, 1.75 mm, 2.00 mm and 3.00 mm.

The generatrix line L8 could be realized by an annular core 8, preferably metallic, which could be a single-strand or multi-strand core, and which will advantageously serve as a winding support for the turns 7 according to which the braid thread 4 is wound in a helix around said generatrix line L8.

Figure 1:
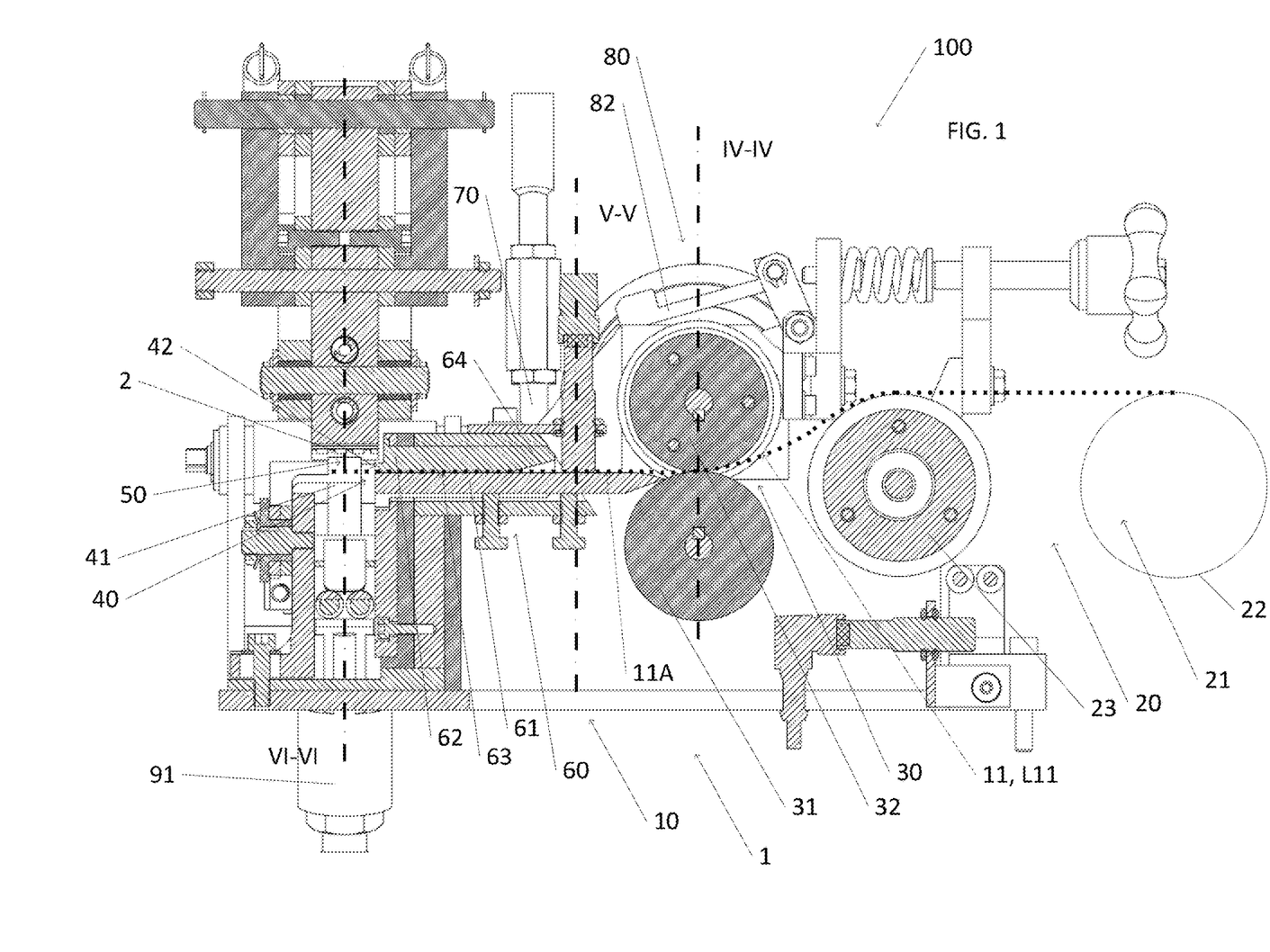
FIG. 1 illustrates a face-on view in cross section, on a section plane, in this case vertical, which contains the longitudinal direction of extension of the strip, of an exemplary embodiment of a crimping station according to the disclosure and the sleeve preparation subassembly thereof.
Figure 2:
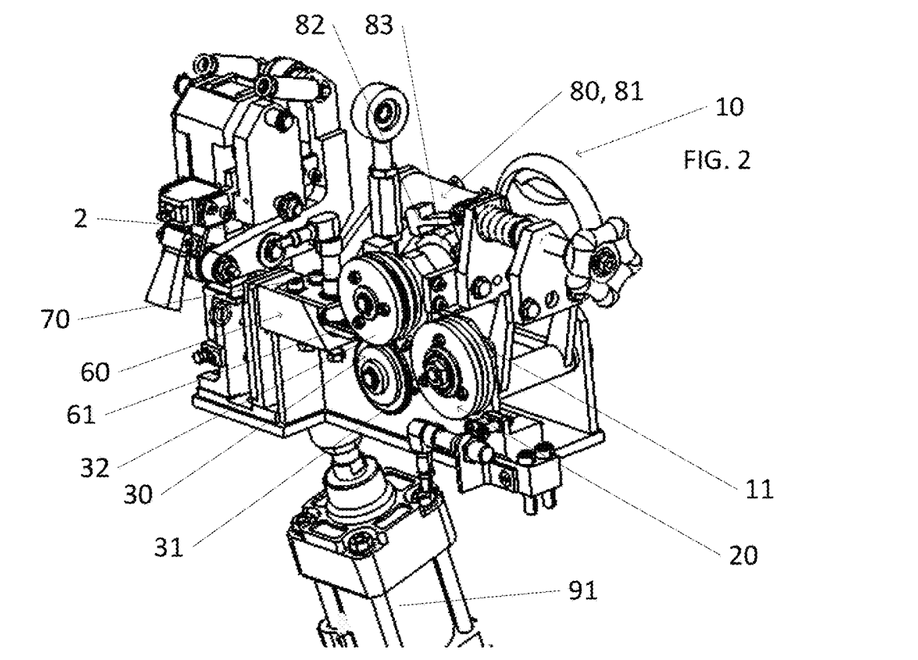
FIG. 2 is a perspective view of the crimping station in FIG. 1.

According to the disclosure, and as can be seen in particular in FIGS. 1 and 2, the crimping station 1 comprises, for feeding the crimping tool 2, a sleeve preparation subassembly 10, which has a feed device 20, a shaping device 30, a cutting device 40 and a loading tool 50.

The feed device 20 supplies a metal strip 11 and conveys said strip 11 as far as the shaping device 30 which is designed to plastically deform said strip 11 in order to give said strip a concave curved cross section 11s, so as to obtain a preformed strip 11A, and then as far as the cutting device 40, which is designed to sever a portion of length of said preformed strip 11A in order to obtain a sleeve preform 12 that the loading tool 50 places within the crimping tool 2, such that said crimping tool 2 can press on and close up said sleeve preform 12, by plastic deformation, to form a sleeve 3 around the first and second thread 4 end portions 5, 6.

Advantageously, such a subassembly 10 makes it possible to manufacture in situ, directly at the crimping station 1, the exact quantity of individual sleeves 3 necessary for the crimping operations to be carried out, from a continuous strip 11 that is directly shaped and cut as many times as necessary to the appropriate length.

The disclosure thus makes it possible to significantly reduce the duration of the crimping operation, and to avoid any wastage of raw material.

In this respect, the use of a continuous strip 11 having a length that is preferably greater than 50 times, greater than 100 times, or even greater than 1000 times the individual length of the sleeve preform 12, advantageously makes it possible to successively produce numerous sleeve preforms 12 without it being necessary to resupply the crimping station 1.

By way of indication, the length of the sleeve preform 12, and therefore the length of the finished sleeve 3, will be between 15 mm and 50 mm, preferably between 20 mm and 40 mm, and for example between 22 mm and 30 mm.

It will also be noted that, according to the disclosure, the cutting operation that gives the sleeve preform 12, and therefore the sleeve 3, its necessary length, advantageously takes place after the strip 11 has been shaped, downstream of the shaping device 30 in the conveying direction of the strip 11 through the subassembly 10.

It is thus advantageously possible to preform the strip 11, and therefore the sleeve 3, in a "joint" and simple manner, and then divide the preformed strip 11A only at a later stage into individual units to obtain the sleeve preforms 12.

Moreover, it is then not necessary to individually adjust or adapt the shape of said sleeve preforms 12 after the cutting operation and before the crimping operation.

In particular, it will be noted that the concave curved shape conferred by the shaping device 30 makes it advantageously possible to create the recess in the sleeve preform 12, in which recess the thread 4 will be accommodated, during the crimping operation, once said sleeve preform 12 has been placed in the crimping tool 2.

In this way, the operations of producing, transferring and handling the sleeve preforms 12 are limited. Crimping can thus be carried out reliably, with a much shorter cycle time.

Similarly, it will be noted that the sleeve preform 12 is prepared advantageously in a single, one-way, pass of the strip 11, from upstream to downstream, from the feed device 20 to the cutting device 40, and in particular in a single pass through the shaping device 30, this simplifying the arrangement and the control of the crimping station 1.

By convention, the terms "upstream" and "downstream" will be used with respect to the normal conveying direction of the strip 11 through the preparation subassembly, oriented from the feed device 20 to the cutting device 40.

The strip 11 may preferably be made of steel, optionally covered with a zinc-based alloy or a copper-based alloy such as brass, or be made of a sufficiently ductile copper-based alloy. According to a preferred possible implementation, the strip 11 could be made as a band of brass-coated mild steel.

The strip 11 will initially have a flat shape, with a section that is preferably substantially or exactly rectangular.

Preferably, the thickness of the strip 11 will be between 0.20 mm (i.e. 2 tenths of a millimetre) and 0.50 mm (i.e. 5 tenths of a millimetre), and more preferably between 0.25 mm and 0.40 mm.

The frontal width of the strip 11, which will depend in particular on the perimeter of the section of thread 4 that is intended to be covered with the sleeve 3, will preferably be between 3 mm and 10 mm, preferably between 4 mm and 7 mm.

The strip 11 extends in one piece lengthwise in a longitudinal direction L11, which starts from the feed device 20, passes through the shaping device 30 and reaches the cutting device 40, as can be seen in FIG. 1.

Preferably, the shaping device 30 gives the strip 11 a U-shaped cross section 11S, along a bending line that coincides with the longitudinal direction L11 of said strip 11.

As a result, the preformed strip 11A preferably has a gutter shape.

It will be noted that the choice of a bending line parallel to and preferably coincident with the longitudinal direction L11 makes it possible to preform the strip 11 *i*) continuously, without it being necessary to cut said strip 11 in advance, and ii) on the fly, that is to say gradually as the strip 11 is being conveyed through the shaping device 30, and more generally through the sleeve preparation subassembly 10.

Such a choice is particularly suitable for shaping of the strip 11 by rolling.

Figure 4:
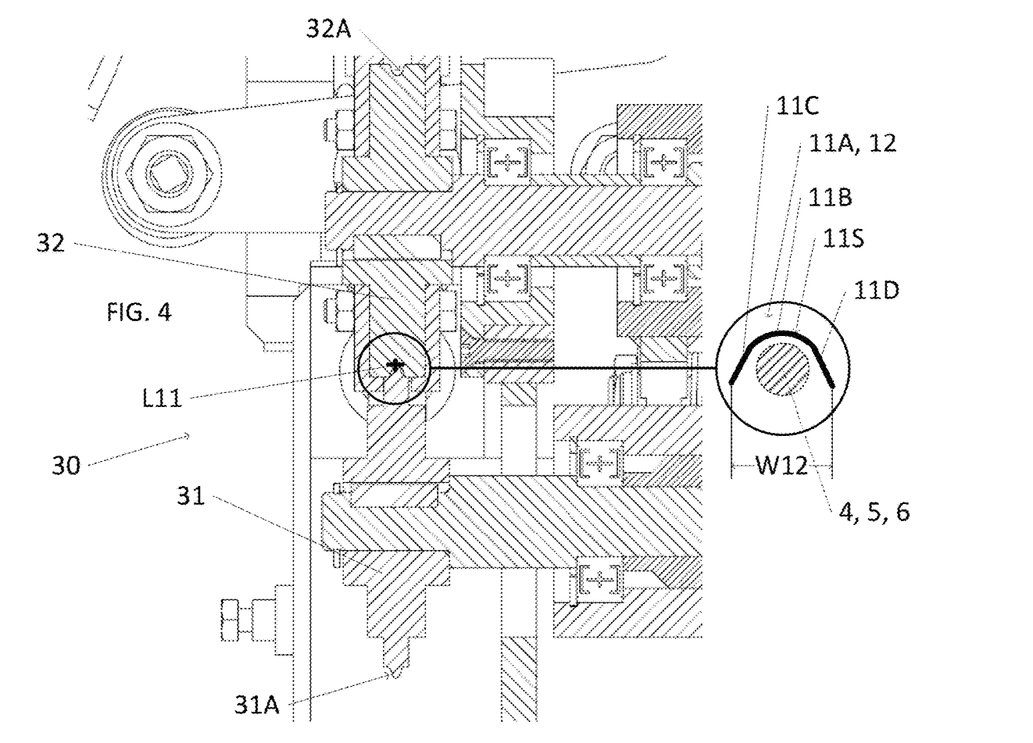
FIG. 4 illustrates a view in cross section, perpendicular to the longitudinal direction of the strip, of a device for shaping the strip that is able to shape the strip by rolling between two shaping rollers.

In this respect, the shaping device 30 preferably comprises, as can be seen clearly in FIG. 4, two counter-rotating shaping rollers 31, 32 between which the strip 11 is engaged and which are provided respectively with a male impression 31A and with a matching female impression 32A which correspond to the shape of the curved cross section 11S intended to be conferred on the strip 11.

The U-shaped cross section 11S, and consequently the cross section of the sleeve preform 3 that is obtained from the preformed sleeve 11A, preferably has a rounded bottom 11B, corresponding to the bending line, and two lateral legs 11C, 11D, which preferably flare from the bottom 11B so as to exhibit an angular opening that increases in the direction of the outside of the cross section 11S, as can be seen in the ring attached to FIG. 4.

Preferably, each of the impressions 31A, 32A of the shaping rollers 31, 32 has a revolution shape about the axis of rotation of its respective shaping roller 31, 32, for example an annular groove for the female impression 32A and a shoulder with a rounded point for the male impression 31A.

Moreover, the axes of rotation of the two shaping rollers 31, 32 will preferably be mutually parallel.

Preferably, the sleeve preform 12 has, along its entire length, an opening of which the width W12 is equal to or greater than the largest diameter of the first thread end portion 5 and of the second thread end portion 6, as is schematically shown in FIG. 4, such that the crimping tool 2 can press the sleeve preform 12 on said thread end portions 5, 6 by lateral approach, transversely to the longitudinal direction of said thread end portions 5, 6.

The sleeve preform 12 thus forms as it were a split sleeve, which the crimping tool 2 will be able to enclose and squeeze onto the thread 4 end portions 5, 6 by bending the lateral legs 11C, 11D against the perimeter of the section of said thread 4, in an angular sector of said section of the thread 4 that is situated in the half-plane diametrically opposite, with respect to the center of the section of the thread 4, the half-plane that contains the angular sector of the thread 4 against which the bottom 11B of the sleeve preform 12 is pressed.

Advantageously, such a lateral, transverse, approach is easy to implement and to automate, in particular since it is no longer necessary to longitudinally engage the sleeve 3 onto each of the end portions 5, 6.

Moreover, the dimensions of the sleeve preform 12, and more particularly the total length of the bottom 11B and of the lateral legs 11C, 11D of the cross section 11S, that is to say the dimension of the sleeve preform 12 that corresponds to the frontal width of the strip 11, are advantageously chosen such that the sleeve 3 that results from the plastic bending of the sleeve preform 12 on itself encloses within it a single section of a thread 4, that is to say such that the sleeve 3 envelops a single section of thread 4, and is thus coaxial with each of the individual end portions 5, 6 of said thread 4.

Thus, in particular, in the case of a braided torus 4, which comprises, in a single torus cross section, a plurality of individual sections of the braid thread 4 that each correspond to a helical turn 7, the dimensions of the sleeve preform 12, and more particularly the total length of the bottom 11B and of the lateral legs 11C, 11D of the cross section 11S of said sleeve preform 12, that is to say the perimeter that said sleeve preform 12 can cover around the longitudinal direction of the braid thread 4 when said sleeve preform has been bent into its final sleeve shape 3, correspond preferably to a fraction, typically 65% to 100%, preferably 70% to 99%, or 75% to 95%, of the perimeter of a single individual section of the braid thread 4, such that the sleeve 3 finally contains a single individual section of the braid thread 4, the other individual sections of the braid thread 4 that belong to the same cross section of the braided torus being located outside the sleeve 3, as can be seen in particular in FIG. 9.

In other words, the sleeve 3 will preferably be dimensioned so as not to envelop the entire section of the braided torus, that is to say so as not to envelop all of the turns 7 of the braid thread 4, but only the individual section that corresponds to the junction between the first and the second end portion 5, 6.

This advantageously avoids the creation of an overthickness of material on the bead wire 9, and more particularly on the radially outer surface of the bead wire 9, thus allowing said bead wire 9 not to have an abrasive nature with respect to the rubber-based plies, in particular the carcass ply, which form the casing of the pneumatic tyre.

It will also be noted that, preferably, once the sleeve preform 12 has been closed up into a sleeve on the end portions 5, 6, and particularly on an individual section of the braid thread 4 corresponding to the section of said end portions 5, 6, the lateral legs 11C, 11D do not overlap and preferably do not touch one another edge to edge, meaning that the sleeve covers less than 100% of the circumference of the section of the thread 4. This avoids creating unnecessary overthicknesses of material.

By way of indication, the frontal width of the strip 11, considered perpendicularly to the longitudinal direction L11, will preferably be between 4 mm and 7 mm, as indicated above, in order to cover typically between 70% and 99% of the circumference of an (individual) section of thread 4.

It will also be noted that, in order for it to be possible to distinguish the end portions 5, 6 from the rest of the braided torus during the crimping operation, the crimping station 1 can also be provided with spacer members (not shown), such as paddles, which are arranged so as to be able to engage with the end portions 5, 6 and temporarily push out said end portions 5, 6 by bending them with respect to the constituent turns 7 of the body of the braided torus, so as to place the corresponding cross sections of the end portions 5, 6 at a distance from the body of the braided torus, and thus open up, between said end portions 5, 6 and the body of the braided torus, the passage necessary for the insertion and the bending of the lateral legs 11C, 11D of the sleeve preform 12 about the section of said end portions 5, 6 of the thread 4.

Figure 6:
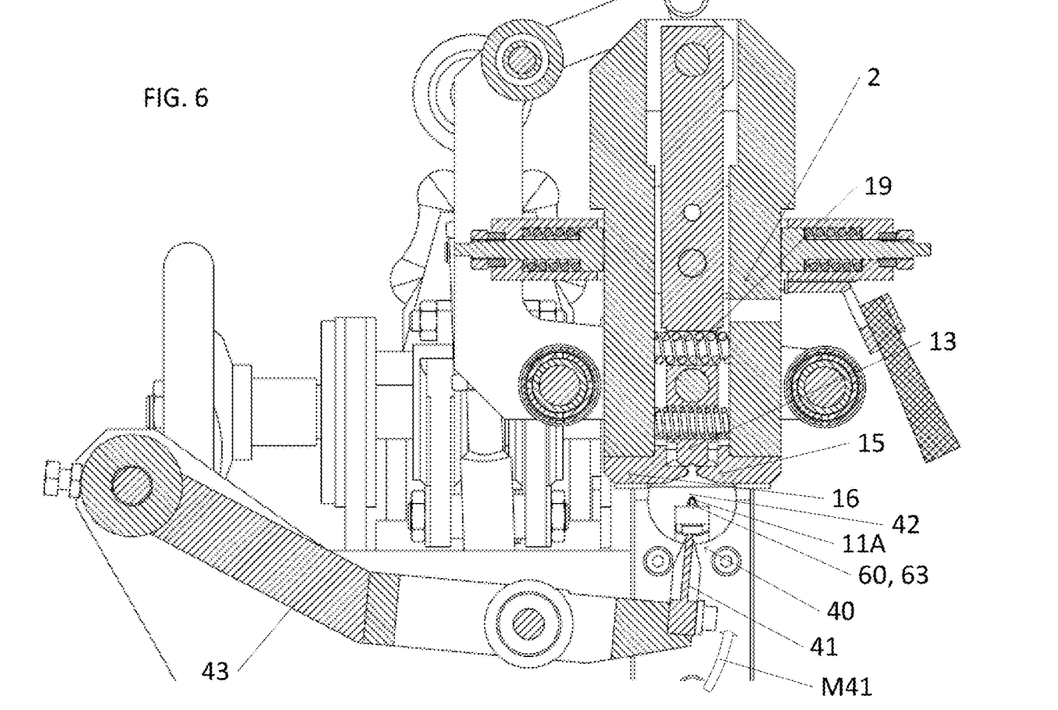
FIG. 6 illustrates a view in cross section, perpendicular to the longitudinal direction of the strip, of the crimping tool of the station of FIGS. 1 to 5 in the reloading position, and also a punch, said punch forming both a cutting tool, which makes it possible to remove a sleeve preform from the end of the preformed strip, and a loading tool capable of conveying said sleeve preform into the crimping tool.
Figure 7:
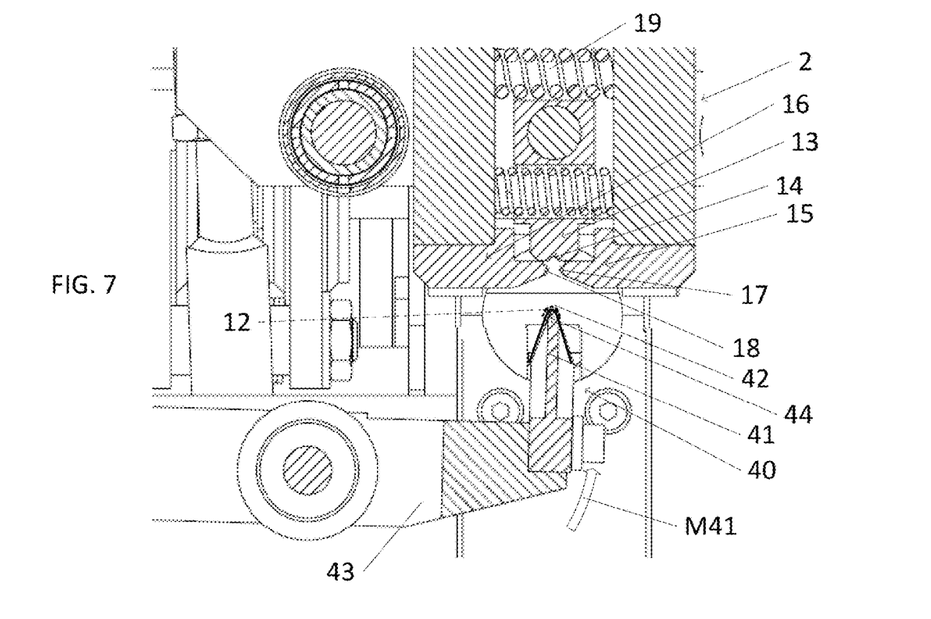
FIG. 7 illustrates a detail view, in the same section plane as FIG. 6, of the punch engaging the preformed strip so as to detach the sleeve preform therefrom.
Figure 8:
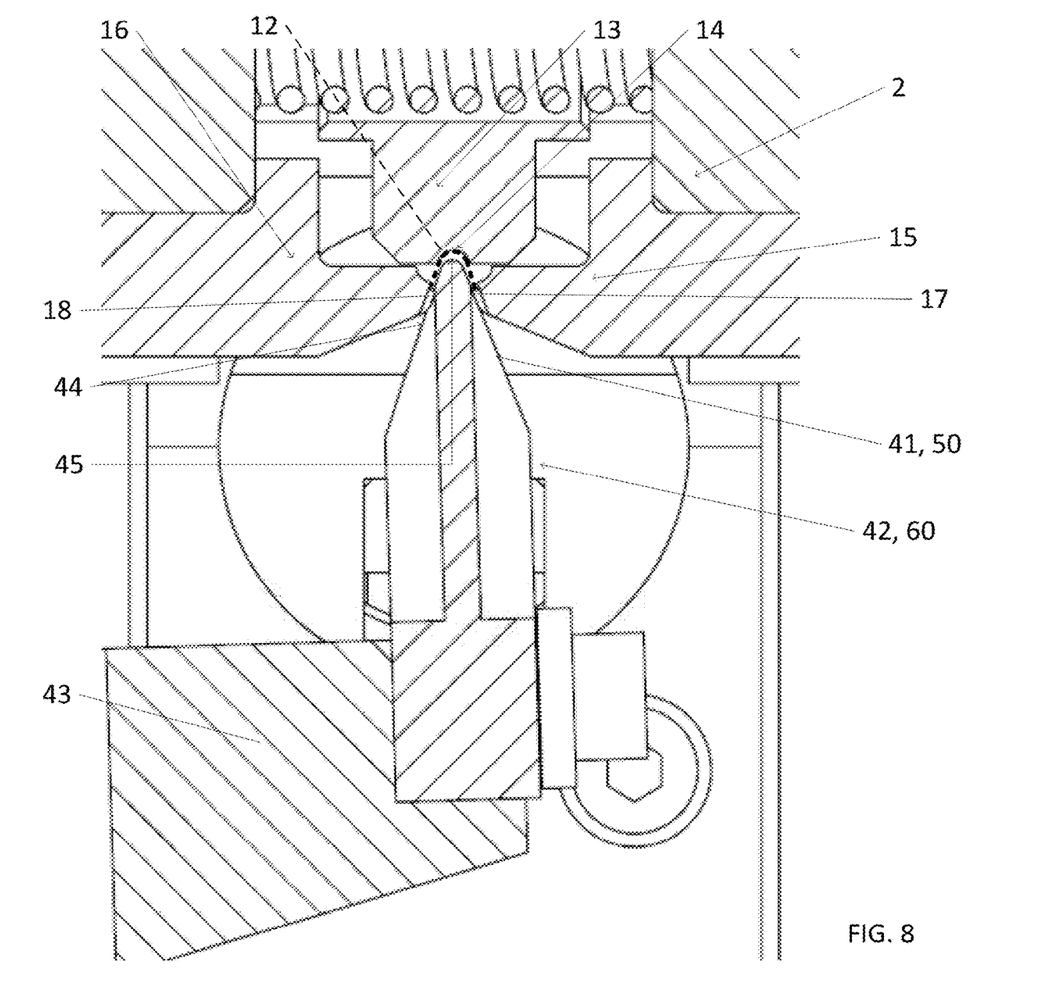
FIG. 8 illustrates a detail view, in the same section plane as FIGS. 6 and 7, of the end of the movement of the punch and the fitting of the sleeve preform within the crimping tool.

As can be seen in particular in FIGS. 6, 7 and 8, the crimping tool 2 may comprise a plurality of jaws 13, 15, 16, comprising a bottom jaw 13 designed to receive, preferably in a rounded recess 14, the bottom 11B of the sleeve preform 12, and a first lateral jaw 15 and a second lateral jaw 16.

The first lateral jaw 15 and the second lateral jaw 16 are designed to engage respectively with the first lateral leg 11C and with the second lateral leg 11D of the sleeve preform 12, and to move towards one another, transversely to the mean line of the thread 4, so as to bend said first lateral leg 11C and said second lateral leg 11D of the sleeve preform 12 toward one another, by plastic deformation, in order to close up said sleeve preform 12, in an enveloping manner, on the section of said thread 4 and thus trap the end portions 5, 6 inside the sleeve 3.

The lateral jaws 15, 16 may have any shape and any kinematics for accentuating the curvature, in this case the concavity, of the sleeve preform 12, and more particularly of the lateral legs 11C, 11D thereof, by plastic deformation counter to the thread 4, in order to obtain the finished sleeve 3.

In order to ensure that the sleeve preform 12 is held within the crimping tool 2 until said crimping tool 2 has been engaged over the thread 4, the lateral jaws 15, 16 could be elastically preloaded towards one another by means of one or more suspension springs 19, and have non-return rims 17, 18 that are able to cooperate with the sleeve preform 12 by snap-fastening, as is illustrated in FIG. 8.

Preferably, the sleeve preform 12 will rest stably on said non-return rims 17, 18 by way of the free ends of its lateral legs 11C, 11D, thereby avoiding any dropping of said sleeve preform 12.

Of course, during the crimping operation, one can achieve first of all closing the crimping tool 2 by forcing the lateral jaws 15, 16 towards one another in order to cause the closure of the sleeve preform 12 and thus the crimping of the sleeve 3, and then, once the sleeve 3 has been effectively crimped on the thread 4, forcing the crimping tool 2 to open by moving the lateral jaws 15, 16 apart, in order to release the end portions 5, 6 that have now been joined together by said sleeve 3.

These forced movements of the lateral jaws 15, 16 could be effected, if applicable counter to the suspension spring 19, by any appropriate driving member, such as a cylinder or an electric motor.

Preferably, as is schematically shown in FIG. 1, the feed device 20 comprises a pay-off device 21 provided with a reel holder that is designed to receive a reel 22 containing a stock of strip 11 and to allow said strip 11 to be unwound.

It would thus be possible to benefit from a large stock of strip 11 in one piece, which gives the crimping station 1 a great deal of autonomy.

The use of interchangeable reels 22 improves the storage conditions of the strip 11 and makes it easier to resupply the crimping station 1.

By way of indication, the reel 22 could contain a strip 11, the length of which is equal to or greater than 50 times, equal to or greater than 100 times, equal to or greater than 500 times, if not equal to or greater than 1000 times or even equal to or greater than 4000 times the individual length of the sleeve preform 12, and for example between 5000 (five thousand) times and 20 000 (twenty thousand) times the individual length of the sleeve preform 12.

The feed device 20 may preferably have a centring roller 23, intended to guide the strip 11 towards the shaping device 30, in particular when said strip 11 comes from the unwinding of a reel 22.

To this end, as can be seen in FIG. 2, the centring roller 23 could for example have a flat-bottomed annular groove, the width of which is equal to or slightly greater than the frontal width of the strip 11.

This will ensure precise and stable guidance of the strip 11, which in particular protects said strip 11 from damage caused by twisting, dropping or jamming.

Preferably, as can be seen clearly in FIGS. 6 to 8, the cutting device 40 comprises a mobile punch 41 which is designed to sever the preformed strip 11A by effecting a shearing movement M41 counter to an anvil 42 in order to remove a sleeve preform 12 from said preformed strip 11A.

Particularly preferably, said mobile punch 41 may also form the loading tool 50 in that it is designed, following the shearing cutting operation, to continue its movement M41 and carry the sleeve preform 12 until said sleeve preform 12 is engaged in the crimping tool 2 positioned on standby opposite said punch 41, as is illustrated in FIG. 8.

The anvil 42 has the function of guiding the preformed strip 11A that enters the cutting device 40 and to provide support for said preformed strip 11A while the end of said preformed strip 11A is placed so as to project longitudinally into the path of the punch 41, preferably perpendicularly to said path of the punch 41, by a length equal to the length of the desired sleeve preform 12.

Thus, the punch 41 can catch the projecting portion of the preformed strip 11A (FIG. 7), shear the latter counter to the anvil 42, and then carry the sleeve preform 12 thus detached from the strip 11 as far as the crimping tool 2 (FIG. 8).

The shearing movement M41 preferably comprises an ascending vertical component, as is illustrated in FIGS. 6 to 8.

If appropriate, the movement M41 of the punch 41 may be an ascending rocking movement, supported by a corresponding lever 43.

In the present case, the crimping tool 2 will preferably be placed on standby above the anvil 42, in line with the shearing movement M41, with its lateral jaws 15, 16 sufficiently half-open to allow the penetration of the punch 41 capped by the sleeve preform 12.

Preferably, when it penetrates into the crimping tool 2, the punch 41 moves the lateral jaws 15, 16 apart slightly by way of an elastic action counter to the spring 19, in order to pass through the non-return bottleneck formed by said lateral jaws 15, 16 and more particularly by the non-return rims 17, 18 of the latter.

The lateral jaws 15, 16 then partially close again, by elastic return, in this case under the action of the suspension spring 19, sufficiently for said lateral jaws 15, 16, and more particularly the rims 17, 18, to act in the manner of a non-return ratchet which captures and retains the sleeve preform 12 in the tool 2, while leaving the punch 41 free to withdraw, as can be seen in FIG. 8.

Once the sleeve preform 12 is in place in the crimping tool 12, the punch 41 is moved away, in this case moved back down, into standby for the next cutting operation.

Preferably, the punch 41 has preferably, for the one part, a point 44 that has a section that substantially matches the concave curved cross section 11S of the preformed strip 11A, preferably a substantially triangular section as seen in section in a plane normal to the longitudinal direction L11, and, for the other part, a peak ridge 45, forming the tip of said point 44, that extends in the longitudinal direction L11 of the preformed strip 11A and comes to bear in the recess of the portion of length of the preformed strip 11A to be detached.

Such a point 44 advantageously ensures that the portion of preformed strip 11A intended to form the sleeve preform 12 is held effectively and stably both during the operation of severing by shearing, making it possible to achieve clean shearing that avoids damaging or deforming the sleeve preform 12, and during the operation of transferring said sleeve preform 12 to the crimping tool 2, since said sleeve preform 12 is then wedged against the point 44, resting on the peak ridge 45, which said sleeve preform 12 overlaps.

Moreover, the point 44 advantageously favours, by the wedge effect, the elastic moving apart of the lateral jaws 15, 16 when the punch 41 passes the sleeve preform 12 into the crimping tool 2 and positions it therein.

Preferably, the crimping station 1 comprises a straightening guide 60 provided with a rail 61 and a counterpart rail 62 which are both rectilinear and extend between the shaping station 30 and the cutting station 40, parallel to the longitudinal direction L11 of the strip 11, and which define, between one another, a rectilinear straightening passage 63, the shape of which corresponds to that of the curved cross section 11S of the preformed strip.

Figure 5:
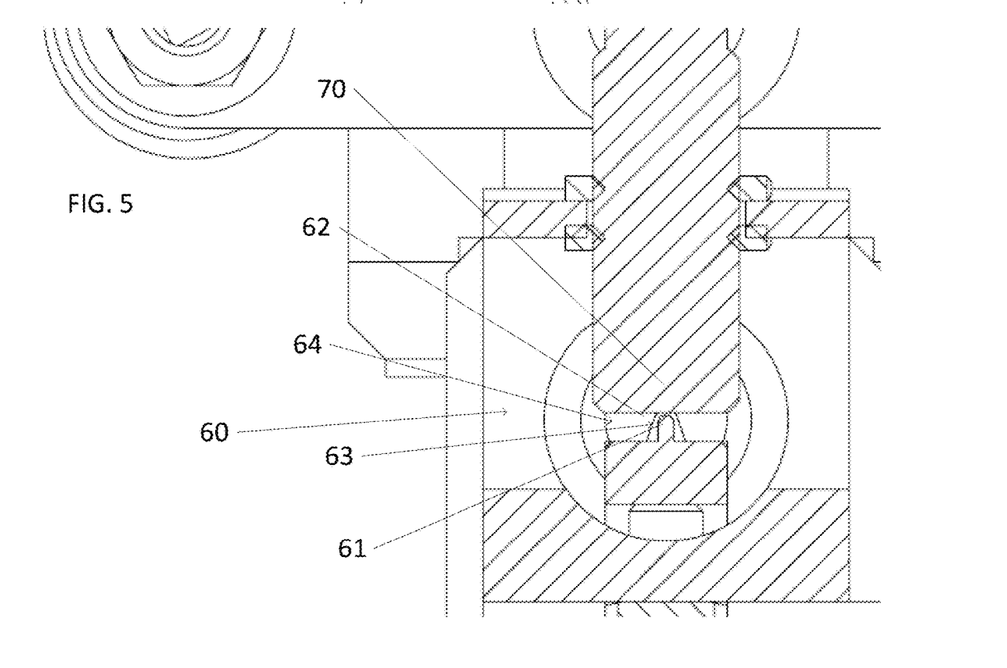
FIG. 5 illustrates a detail view in cross section, perpendicular to the longitudinal direction of the strip, of the inlet of a straightening guide which confers a rectilinear arrangement on the preformed strip.

As can be seen in FIG. 5, the rail 61 and the counterpart rail 62 preferably have complementary, U-shaped, shapes in order to delimit the straightening passage 63. The rail 61 will thus preferably have a convex section, and the counterpart rail 62 a concave section.

Preferably, the rail 61 and the counterpart rail 62 will be stacked vertically, the rail 61 forming a lower rail and the counterpart rail 62 an upper rail.

Advantageously, the straightening guide 60 makes it possible to ensure the straightness of the preformed strip 11A when the latter arrives at the cutting device 40, and consequently the straightness of the sleeve preform 12, this facilitating in particular the operations of cutting said preform 12 and of transferring said preform 12 to the crimping tool 2, and then the holding of said sleeve preform 12 within the crimping tool 2 until the crimping operation.

More particularly, the straightening guide 60 will have the capacity of plastically deforming the strip 11, by sliding said strip 11 between, and against, the rail 61 and the counterpart rail 62, to the extent necessary to compensate for any tendency of the strip 11 to bend, in the direction of its length, after it has been unwound from the reel 22 and/or after the rolling to which said strip 11 is subjected in the shaping device 30.

Of course, the rail 61, the counterpart rail 62, and more specifically the straightening passage 63, will form a straight segment with a sufficient length to obtain the desired straightening effect, for example with a length equal to or greater than 1.5 times, preferably equal to or greater than 2 times the individual length of the sleeve preform 12, and, for example, preferably between 2 times and 5 times said individual length of the sleeve preform 12.

Furthermore, inasmuch as, for the one part, the strip 11 is potentially sensitive to buckling under longitudinal compression, on account of the frictional stresses that arise from the sliding contact of said strip 11 with the rail 61 and the counterpart rail 62, and inasmuch as, for the other part, the inventors have found that it was preferable to avoid accidental plastic bending of the strip 11 by buckling, since such bending can make the strip 11 unusable by causing said strip to lose the required mechanical strength properties for its use as a sleeve 3, various solutions have been envisaged to limit and/or monitor the occurrence of such a buckling phenomenon, which is liable to cause what is known as "jamming".

To this end, provision could in particular be made for the inlet of the straightening guide 60, and in particular the upstream end of the lower rail 61, or even each of the two upstream ends of the lower rail 61 and of the upper counterpart rail 62, to immediately adjoin the outlet of the shaping rollers 31, 32, so as to ensure immediate guidance of the strip 11 leaving the shaping device 30, by limiting in this way the "free running" travel, that is to say the travel not guided by contact, of the preformed strip 11A between said shaping device 30 and the straightening guide 60.

According to one possible implementation, the rail 61, in this case the lower rail 61, will extend preferably continuously from the outlet of the shaping device 30 as far as the cutting device 40, so as to precisely guide the preformed strip 11A along the entire path that leads from the shaping device 30 to the cutting device 40, and more particularly to the rim of the anvil 42 used for shearing the preformed strip 11A.

According to another possible implementation, use could be made both of a long rail 61 and a long counterpart rail 62, of substantially equal length, which each cover the entire distance that separates, in the longitudinal direction L11, the shaping device 30 from the cutting device 40.

Furthermore, according to a preferred feature which may constitute a wholly separate disclosure, the inlet of the straightening guide 60 may advantageously be provided with a blockage detector 70, preferably an inductive detector, which makes it possible to detect any jamming of the strip 11.

This blockage detector 70 could be formed for example by a proximity sensor, which is arranged above the strip 11, at a distance transversely from the path normally taken by the preformed strip 11A, such that, in the event of jamming, the buckling and therefore the bending under compression of said preformed strip 11A has the effect of shifting a portion of said strip 11 transversely with respect to the nominal path of said strip, in this case more particularly has the effect of shifting said strip height-wise, and therefore of moving the strip 11 towards the detector 70, or even of causing said strip 11 to come into contact with said detector 70, this making it possible to trigger an alert.

The reliability of the straightening guide 60, and more generally of the sleeve preparation subassembly 10 and of the crimping station 1, will therefore be increased.

If necessary, in order to free up the space to incorporate the blockage detector 70, the counterpart rail 62 could be shorter than the rail 61, and placed in a set-back manner downstream of the latter in the direction of longitudinal forward movement of the strip 11.

Furthermore, the inlet of the straightening passage 63 will preferably form a funnel, the counterpart rail 62 being able, to this end, to comprise a chamfer 64, optionally a frustoconical chamfer, which converges towards the opposite rail 61, as can be seen in FIG. 1, such that it is possible, if required, to direct the end of the strip 11 towards the straightening passage 63.

Moreover, the lower rail 61 could then protrude upstream of the counterpart rail 62, such that it is possible to receive the preformed strip 11A and guide it progressively towards the inlet of the straightening passage 63, while preferably supporting said preformed strip 11A vertically beneath the blockage detector 70.

These arrangements will help to limit the risks of the strip 11 becoming jammed in the straightening guide 60.

Preferably, the terminal end of the straightening guide 60, via which the preformed strip 11A emerges on leaving the straightening passage 63, and in this case more preferably the downstream end of the counterpart rail 62, forms the anvil 42 which holds the preformed strip 11A counter to the shearing movement M41 effected by the punch 41.

More particularly, the anvil 42, in this case the terminal end of the straightening guide, preferably forms a flat surface, normal to the longitudinal direction L11 of the preformed strip 11A.

The punch 41 can thus skim said surface, or slide in contact with said surface, in a shearing movement M41 substantially perpendicular to said longitudinal direction L11, allowing a clean and precise cut.

Moreover, by giving the straightening guide 60 a dual role, of a straightener and of an anvil, the compactness of the subassembly 10 is improved.

Furthermore, the crimping station 1 preferably comprises an indexer 80 which is designed to move the strip 11 forward in a stepwise manner, each step corresponding to a predetermined length equal to the individual length of the sleeve preform 12 that is desired.

Said indexer 80 could advantageously comprise a ratchet mechanism 81, comprising for example a notched lever 82 cooperating with a ratchet wheel 83, as can be seen in FIG. 2.

The ratchet mechanism 81 will for example be coupled to the shaping device 30 so as to drive the shaping rollers 31, 32 in rotation over an angular sector, the arc length of which corresponds to the length of strip 11 necessary for manufacturing a sleeve preform 12.

Of course, an adjusting device for freely choosing, from a predetermined range, the length of the sleeve preform 2, and therefore the increment length by which the strip 11 is intended to be moved forward on each step, could be provided.

Advantageously, the indexer 80 will make it possible to move the strip 11 forward sequentially, in order, during a first movement phase, to advance the strip 11 simultaneously through the feed device 20, the shaping device 30, the straightening guide 60 and the cutting device 40, by a length equal to the length of the sleeve preform 12 that is desired, in order to make said length of strip 11 project from the anvil 42, into the path of the punch 41, and then, during a second stopping phase, to stop the advancement of the strip 11 for the time necessary on the one hand for the cutting operation, to allow the punch 41 to sever the strip 11 and carry the sleeve preform 12 into the crimping tool 2, and on the other hand for the crimping operation.

Such cadence-setting of the operation of the crimping station 1, and more particularly of the incremental travel of the strip 11, will make it possible to synchronize the various devices 20, 30, 40, 50, 60 with the operating phases of the crimping tool 2 and to optimize the cycle time.

Figure 3:
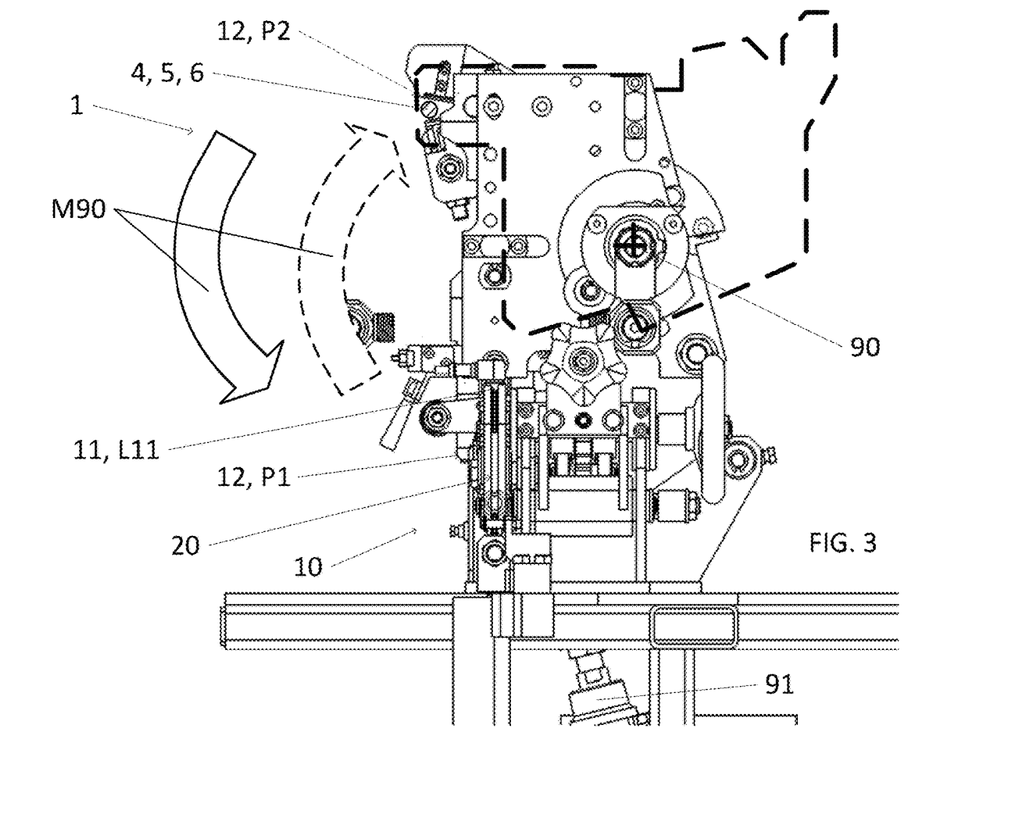
FIG. 3 illustrates a side view of a crimping station in FIGS. 1 and 2, and the capacity thereof to alternately move the crimping tool from a reloading position, in which the crimping tool receives a new sleeve preform, to a crimping position, in which said crimping tool presses and squeezes said sleeve preform onto the thread portions to be joined.

According to a preferred feature which may constitute a wholly separate disclosure, the crimping tool 2 is mounted on a rocker 90 which makes it possible to switch said crimping tool 2 between a reloading position P1, in which said crimping tool 2 can receive the sleeve preform 12 from the sleeve preparation subassembly 10, as is represented by solid lines in FIG. 3, and a working position P2, represented by dashed lines in said FIG. 3, in which said crimping tool 2 is placed opposite the thread end portions 5, 6 to be joined together.

Preferably, switching from the reloading position P1 to the working position P2 will be effected by pitching, about a horizontal axis, preferably by a quarter-turn switching movement M90. End-of-travel stops could be provided to precisely limit the switching movement M90 so as to precisely index the positions P1, P2.

Preferably, the same applies for the reverse switching movement, from the working position P2 to the reloading position P1, which could be effected by returning in the opposite direction.

Such an arrangement will facilitate, for the one part, in a reloading position P1 in which the crimping tool 2 is oriented and open downwardly, as is illustrated in FIGS. 1 and 6, reloading of the crimping tool 2 by an ascending movement of the punch 41, as described above, and, for the other part, in a working position P2 in which said tool is oriented horizontally and open laterally, in this case towards the left in FIG. 3, transverse lateral approaching of the thread end portions 5, 6 to be crimped, in particular if the braided torus is resting on a horizontal plate that is mounted so as to be movable in horizontal translation with respect to the crimping tool 2.

Preferably, the crimping station 1 may comprise a synchronization mechanism which couples the indexer 80 to the rocker 90 so as to synchronize the stepwise forward movement of the strip 11 with the switching movements M90 of the crimping tool 2.

Here again, effective, perfectly timed, coordination of the subassembly 10 and therefore of the crimping station 1 will be favored in this way.

Moreover, one and the same drive member 91, such as a cylinder 91, could more particularly be used to generate both the switching movement M90 of the rocker 90 and, by way of appropriate transmission members belonging to the synchronization mechanism, the movement of the ratchet mechanism 81 of the indexer 80.

This could increase compactness and operating efficiency.

In particular, while the crimping tool 2 leaves its reloading position P1 and passes into its working position P2, the strip 11 could thus be moved forward by an individual length increment in order to prepare, in concurrent time, a length of preformed strip 11A ready to be severed, which is placed awaiting cutting by causing the end of the preformed strip 11A to pass out of the straightening guide 60, protruding longitudinally from the anvil 42.

Thus, as soon as the crimping tool 2 returns into its reloading position P1, for the next crimping cycle, the punch 41 could immediately cut a new sleeve preform 12 and load it into said crimping tool 2.

It will be noted that one, another, or all of the movements necessary for the operation of the sleeve preparation subassembly 10, and more generally of the crimping station 1, could be driven by any appropriate means, and preferably controlled and coordinated automatically by an appropriate control unit, which is preferably electronic.

Furthermore, of course, the disclosure relates as such to a sleeve preparation process according to the disclosure, a corresponding crimping process, and more particularly the application of such a process to the sleeving of bead wires 9 intended to reinforce pneumatic tires.

Of course, the disclosure is in no way limited only to the embodiment variants described in the preceding text, a person skilled in the art being notably capable of isolating or freely combining one or another of the abovementioned features with one another, or of substituting equivalents therefor.

What is claimed is:

1. A crimping station comprising a crimping tool designed to crimp a sleeve around a first end portion of a thread and around a second end portion of the thread in order to join and fix together said first and second end portions, wherein said crimping station comprises a sleeve preparation subassembly which has a feed device that supplies a metal strip and conveys said strip as far as a shaping device designed to plastically deform said strip in order to give said strip a concave curved cross section, so as to obtain a preformed strip, and then as far as a cutting device which is designed to sever a portion of length of said preformed strip in order to obtain a sleeve preform that a loading tool places within the crimping tool, such that said crimping tool can press on and close up said sleeve preform, by plastic deformation, to form a sleeve around the first and second thread end portions.

2. The crimping station according to claim 1, wherein the cutting device comprises a mobile punch which is designed to sever the preformed strip by effecting a shearing movement counter to an anvil in order to remove the sleeve preform from said preformed strip, and in that said mobile punch also forms the loading tool in that it is designed, following the shearing cutting operation, to continue its movement and carry the sleeve preform until said sleeve preform is engaged in the crimping tool positioned on standby opposite said punch.

3. The crimping station according to claim 2, wherein the punch has a point which has a section that substantially matches the concave curved cross section of the preformed strip, and a peak ridge that extends in a longitudinal direction of the preformed strip and comes to bear in a recess of the portion of length of the preformed strip to be detached.

4. The crimping station according to claim 1 wherein the shaping device comprises two counter-rotating shaping rollers between which the strip is engaged and which are provided respectively with a male impression and with a matching female impression which correspond to the shape of the curved cross section intended to be conferred on the strip.

5. The crimping station according to claim 1 wherein the feed device comprises a pay-off device provided with a reel holder designed to receive a reel containing a stock of strip and to allow said strip to be unwound.

6. The crimping station according to claim 1 wherein the crimping station comprises a straightening guide provided with a rectilinear rail and a rectilinear counterpart rail which extend between the shaping station and the cutting station, parallel to a longitudinal direction of the strip, and which define, between one another, a rectilinear straightening passage, the shape of which corresponds to that of the curved cross section of the preformed strip.

7. The crimping station according to claim 6 wherein a terminal end of the straightening guide, through which the preformed strip emerges on leaving the straightening passage, forms an anvil which retains the preformed strip counter to a shearing movement effected by a punch.

8. The crimping station according to claim 6, wherein an inlet of the straightening guide is provided with a blockage detector, preferably an inductive detector, which makes it possible to detect any jamming of the strip.

9. The crimping station according to claim 1 wherein the crimping station comprises an indexer designed to move the strip forward in a stepwise manner, each step corresponding to a predetermined length equal to an individual length of the sleeve preform that is desired.

10. The crimping station according to claim 1 wherein the crimping tool is mounted on a rocker which makes it possible to switch said crimping tool between a reloading position, in which said crimping tool can receive the sleeve preform from the sleeve preparation subassembly, and a working position, in which said crimping tool is placed opposite the thread end portions to be joined together.

11. The crimping station according to claim 9 wherein the crimping station comprises a synchronization mechanism which couples the indexer to a rocker so as to synchronize the stepwise forward movement of the strip with switching movements of the crimping tool.

12. The crimping station according to claim 1 wherein the sleeve preform has, along its entire length, an opening of which the width is equal to or greater than the largest diameter of the first thread end portion and of the second thread end portion, such that the crimping tool can press the sleeve preform on said thread end portions by lateral approach, transversely to the longitudinal direction of said thread end portions.

13. An installation for manufacturing bead wires intended to reinforce tires, in particular pneumatic tires, wherein it comprises a crimping station according to claim 1 for closing on itself a constituent thread of a bead wire.

\* \* \* \* \*